US 11,422,590 B2

United States Patent
Hamlin et al.

(10) Patent No.: US 11,422,590 B2
(45) Date of Patent: Aug. 23, 2022

(54) IHS (INFORMATION HANDLING SYSTEM) OPERATIONS IN RESPONSE TO LID STATE TRANSITIONS

(71) Applicant: Dell Products, L.P., Round Rock, TX (US)

(72) Inventors: Daniel L. Hamlin, Round Rock, TX (US); Vivek Viswanathan Iyer, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 456 days.

(21) Appl. No.: 16/589,959

(22) Filed: Oct. 1, 2019

(65) Prior Publication Data

US 2021/0096606 A1 Apr. 1, 2021

(51) Int. Cl.
*G06F 9/00* (2006.01)
*G06F 1/16* (2006.01)
*G06F 9/4401* (2018.01)

(52) U.S. Cl.
CPC .......... *G06F 1/1677* (2013.01); *G06F 1/1616* (2013.01); *G06F 1/1669* (2013.01); *G06F 1/1681* (2013.01); *G06F 9/4401* (2013.01); *G06F 2200/1637* (2013.01)

(58) Field of Classification Search
CPC .... G06F 1/3287; G06F 1/1616; G06F 1/1677; G06F 1/3218; G06F 1/1681
USPC ....................................................... 713/324
See application file for complete search history.

(56) References Cited

U.S. PATENT DOCUMENTS

| | | | |
|---|---|---|---|
| 5,077,551 A * | 12/1991 | Saitou | G06F 1/1677 361/679.55 |
| 7,707,436 B2 | 4/2010 | Tsukamoto | |
| 8,203,833 B2 | 6/2012 | Huang et al. | |
| 9,298,296 B2 * | 3/2016 | Park | G06F 3/0412 |
| 9,383,852 B2 * | 7/2016 | Kim | G06F 1/3287 |
| 9,727,134 B2 * | 8/2017 | Aurongzeb | G06F 1/1618 |
| 2003/0011972 A1 * | 1/2003 | Koo | G06F 1/1679 361/726 |
| 2005/0038982 A1 * | 2/2005 | Park | G06F 1/206 713/1 |
| 2005/0062715 A1 * | 3/2005 | Tsuji | G06F 1/1677 345/158 |
| 2006/0139326 A1 * | 6/2006 | Tsukamoto | G06F 1/3218 345/158 |
| 2006/0238439 A1 * | 10/2006 | Fuller | G06F 1/1616 345/1.1 |

(Continued)

*Primary Examiner* — Volvick Derose
(74) *Attorney, Agent, or Firm* — Fogarty LLP

(57) ABSTRACT

Methods and systems are provided for configuring operations of an Information Handling System (IHS) that includes a lid panel and a base panel, such as a laptop or convertible laptop. A first lid state is determined based at least partially on a first angle of a hinge connecting the lid panel and base panel. A transition of the hinge angle to a second angle is determined, indicating movement of the lid by the user. Based at least partially on the second hinge angle, a second lid state is determined. Based on the transition from the first lid state to the second lid state, modifications to a plurality of IHS outputs are determined and the plurality outputs are reconfigured. In some embodiments, a speed of the hinge angle transition is determined and the modifications to the IHS outputs are determined based on the speed of the hinge angle transition.

20 Claims, 7 Drawing Sheets

(56) References Cited

U.S. PATENT DOCUMENTS

| | | | |
|---|---|---|---|
| 2010/0331063 A1* | 12/2010 | Grant | G06F 1/1624 |
| | | | 455/575.4 |
| 2011/0161710 A1* | 6/2011 | Huang | G06F 1/1677 |
| | | | 324/693 |
| 2011/0179864 A1* | 7/2011 | Raasch | G11B 19/042 |
| | | | 73/493 |
| 2012/0001943 A1* | 1/2012 | Ishidera | G06F 3/0346 |
| | | | 345/659 |
| 2012/0278638 A1* | 11/2012 | Wang | G06F 1/1677 |
| | | | 361/679.02 |
| 2013/0106704 A1* | 5/2013 | Vidal | G06F 3/0219 |
| | | | 345/169 |
| 2014/0101577 A1* | 4/2014 | Kwak | G06F 3/1431 |
| | | | 715/761 |
| 2014/0146446 A1* | 5/2014 | Matsuda | G06F 3/0202 |
| | | | 361/679.01 |
| 2015/0097788 A1* | 4/2015 | Sip | G06F 1/3262 |
| | | | 345/173 |
| 2015/0116362 A1* | 4/2015 | Aurongzeb | G06F 3/1446 |
| | | | 345/650 |
| 2017/0010636 A1* | 1/2017 | Shao | G06F 1/1616 |
| 2017/0235355 A1* | 8/2017 | Alshinnawi | G06F 1/1677 |
| | | | 713/323 |
| 2018/0330535 A1* | 11/2018 | Hawthorne | G06F 3/04845 |
| 2020/0081518 A1* | 3/2020 | Yang | G06F 1/1677 |
| 2022/0012376 A1* | 1/2022 | Hsieh | G06F 1/1677 |

\* cited by examiner

IHS (INFORMATION HANDLING SYSTEM) OPERATIONS IN RESPONSE TO LID STATE TRANSITIONS

FIELD

This disclosure relates generally to Information Handling Systems (IHSs), and more specifically, to IHSs that support multiple physical configurations.

BACKGROUND

As the value and use of information continues to increase, individuals and businesses seek additional ways to process and store information. One option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

In some instances, IHSs may support multiple different physical configurations. For instance, a laptop includes a base panel and a lid panel, where the two panels may be rotated relative to each other about a hinge. When such laptops are in a closed configuration, the two panels are latched together. In an open position, the lid panel of the laptop is unlatched and rotated by the user until the screen of the display that is incorporated in the lid panel faces the user. In such configuration of laptops, the lid panel may be opened by a user to various different hinge angles. Once the two panels are unlatched, current laptops typically support only one mode of laptop operations regardless of the angle of rotation of the lid panel. For instance, current laptops operate the same if the lid panel is opened 5 degrees or 95 degrees from a closed position.

Another type of IHS that supports multiple different physical configurations is a convertible laptop, that may also be referred to as a hybrid laptop or a 2-in-1 device. As with non-convertible laptops, the convertible laptop may include a base panel and a lid panel that are connected by a hinge that allows the two panels to be rotated relative to each other. However, rather than include an integrated keyboard, some convertible laptops include displays integrated in both the base panel and lid panel. Such convertible laptops may be physically configured by a user of the IHS in a variety of different configurations, such as conventional laptop, tablet and e-book configurations.

SUMMARY

In various embodiments, methods are provided for configuring operations of an Information Handling System (IHS) that includes a lid panel and a base panel. The methods may include: determining a first lid state of the IHS based at least in part on a first angle of a hinge connecting the lid panel and the base panel of the IHS; detecting a transition of the angle of the hinge to a second angle; determining a second lid state of the IHS based at least in part on the second angle of the hinge; determining modifications to a plurality of outputs of the IHS based on the transition from the first lid state to the second lid state; and reconfiguring the plurality outputs of the IHS based on the determined modifications.

In additional embodiments, the methods further include determining a speed of the transition of the angle of the hinge to the second angle, wherein the modifications to the plurality of outputs are determined based on the speed of the transition of the angle of the hinge to the second angle. In additional method embodiments, if the speed of the transition of the hinge angle is above a threshold, the modifications to the plurality of outputs comprise terminating audio outputs by the IHS. In additional method embodiments, if the speed of the transition of the hinge angle is above a threshold, the modifications to the plurality of outputs comprise minimizing a plurality of interfaces displayed by the IHS. In additional method embodiments, if the speed of the transition of the hinge angle is above a threshold, the modifications to the plurality of outputs comprise terminating outputs to one or more displays utilized by the IHS. In additional method embodiments, the first lid state and the second lid state are determined further based on an orientation of the IHS. In additional method embodiments, the modifications to a plurality of outputs of the IHS are further based on a change in the orientation of the IHS. In additional method embodiments, if the speed of the transition of the hinge angle is below a threshold, the modifications to the plurality of outputs comprise pausing a plurality of multimedia outputs of the IHS.

In various additional embodiments, an Information Handling System (IHS) includes: a base panel; a lid panel coupled to the based panel via a hinge; and a logic unit configured by firmware instructions to: determine a first lid state of the IHS based at least in part on a first angle of the hinge; detect a transition of the angle of the hinge to a second angle; determine a second lid state of the IHS based at least in part on the second angle of the hinge; and notify a process of the operating system of the IHS of the transition from the first lid state to the second lid state. The IHS further includes one or more processors; and a memory device coupled to the one or more processors, the memory device storing computer-readable instructions that, upon execution by the one or more processors, cause the system to: determine, based on the notification, modifications to a plurality of outputs of the IHS based on the transition from the first lid state to the second lid state; and reconfigure the plurality outputs of the IHS based on the determined modifications.

In additional IHS embodiments, the logic unit is further configured by firmware instructions to: determine a speed of the transition of the angle of the hinge to the second angle; and notify the operating system process of the operating system of the IHS of the speed of the transition of the angle of the hinge to the second angle. In additional IHS embodiments, if the notified speed of the transition of the hinge angle is above a threshold, the modifications to the plurality of outputs comprise terminating audio outputs by the IHS. In additional IHS embodiments, if the notified speed of the transition of the hinge angle is above a threshold, the modifications to the plurality of outputs comprise minimizing a plurality of interfaces displayed by the IHS. In additional IHS embodiments, if the notified speed of the transition of the hinge angle is above a threshold, the modifications to the plurality of outputs comprise terminating outputs to one or more displays utilized by the IHS. In additional IHS embodiments, wherein the first lid state and the second lid state are determined further based on an orientation of the IHS. In additional IHS embodiments, the modifications to a plurality of outputs of the IHS are further based on a change in the orientation of the IHS. In additional IHS embodiments, if the notified speed of the transition of the hinge angle is below a threshold, the modifications to the plurality of outputs comprise pausing a plurality of multimedia outputs of the IHS.

In various additional embodiments, a computer-readable storage device includes instructions stored thereon for configuring operations of an Information Handling System (IHS) that includes a lid panel and a base panel. The execution of the instructions by one or more processors of the IHS causes the one or more processors to: determine a first lid state of the IHS based at least in part on a first angle of the hinge; detect a transition of the angle of the hinge to a second angle; determine a second lid state of the IHS based at least in part on the second angle of the hinge; and notify a process of the operating system of the IHS of the transition from the first lid state to the second lid state, wherein a plurality outputs of the IHS are reconfigured based on the notification.

In additional storage device embodiments, the instructions further cause the one or more processors to: determine a speed of the transition of the angle of the hinge to the second angle; and notify the operating system process of the operating system of the IHS of the speed of the transition of the angle of the hinge to the second angle. In additional storage device embodiments if the notified speed of the transition of the hinge angle is above a threshold, the modifications to the plurality of outputs comprise at least one of: terminating audio outputs by the IHS, minimizing a plurality of interfaces displayed by the IHS, and terminating outputs to one or more displays utilized by the IHS. In additional storage device embodiments if the notified speed of the transition of the hinge angle is below a threshold, the modifications to the plurality of outputs comprise pausing a plurality of multimedia outputs of the IHS.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources, such as a Central Processing Unit (CPU) or hardware or software control logic, Read-Only Memory (ROM), and/or other types of nonvolatile memory.

Figure 1:
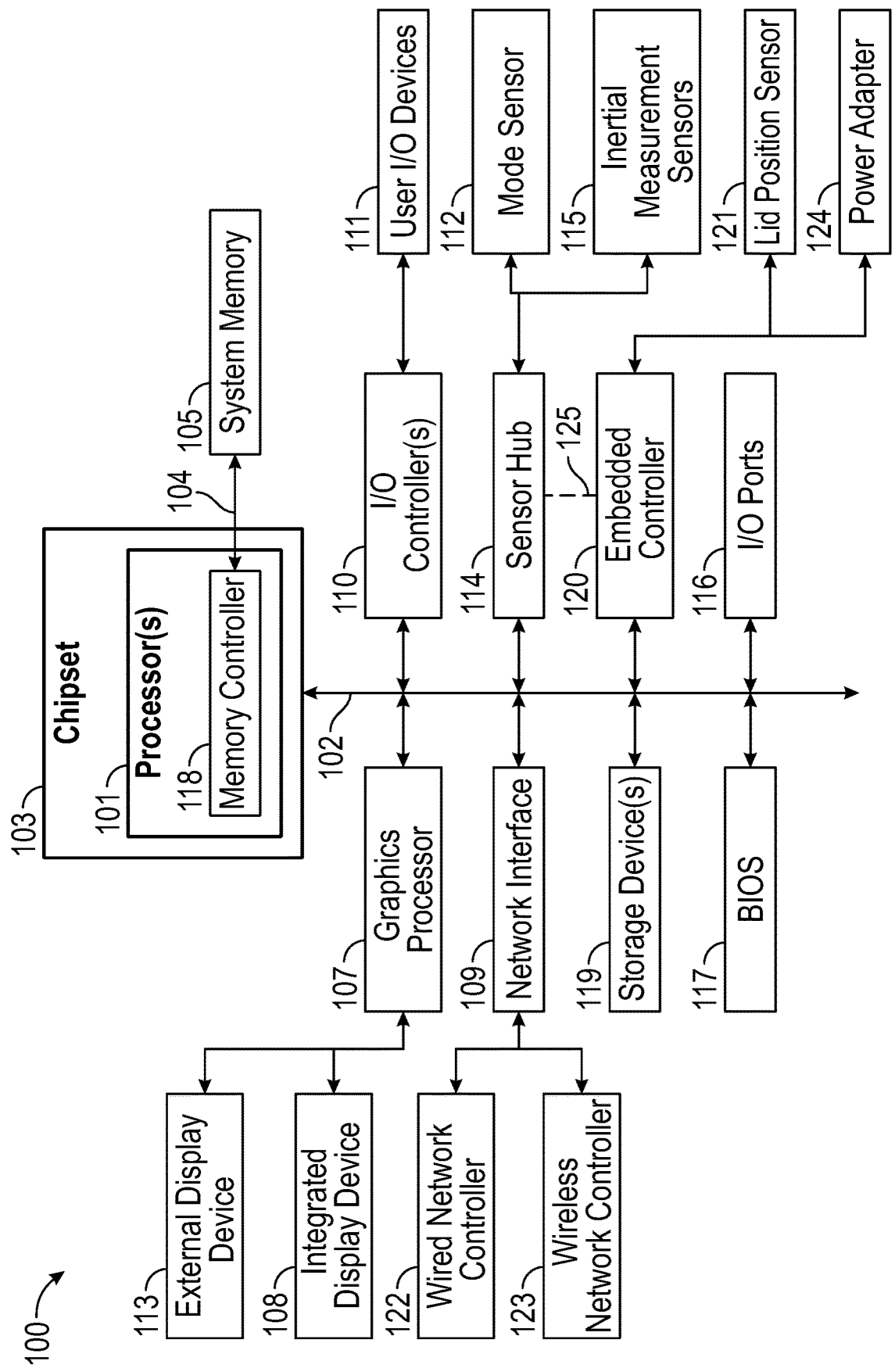
FIG. 1 is a block diagram depicting certain components of an IHS configured according to various embodiments for performing operations in response to detected changes in the lid state of the IHS.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components. An example of an IHS is described in more detail below. FIG. 1 shows an example of an IHS configured to implement the systems and methods described herein according to certain embodiments. It should be appreciated that although certain IHS embodiments described herein may be discussed in the context of a personal computing device, other embodiments may be utilized.

FIG. 1 is a block diagram illustrating certain components of an IHS 100 configured according to certain embodiments for performing operations in response to detected changes in the lid state of the IHS. In various embodiments, IHS 100 may include an embedded controller 120 and a sensor hub 114 that may each execute program instructions that cause each of these components to perform certain of the operations disclosed herein. In certain embodiments, IHS 100 may be configured as a member of an enterprise network by which a variety of computing services may be provided to IHS 100.

IHS 100 includes one or more processors 101, such as a Central Processing Unit (CPU), that execute code retrieved from a system memory 105. Although IHS 100 is illustrated with a single processor 101, other embodiments may include two or more processors, that may each be configured identically, or to provide specialized processing functions. Processor 101 may include any processor capable of executing program instructions, such as an Intel Pentium™ series processor or any general-purpose or embedded processors implementing any of a variety of Instruction Set Architectures (ISAs), such as the x86, POWERPC®, ARM®, SPARC®, or MIPS® ISAs, or any other suitable ISA.

In the embodiment of FIG. 1, the processor 101 includes an integrated memory controller 118 that may be implemented directly within the circuitry of the processor 101, or the memory controller 118 may be a separate integrated circuit that is located on the same die as the processor 101. The memory controller 118 may be configured to manage the transfer of data to and from the system memory 105 of the IHS 100 via a high-speed memory interface 104. The system memory 105 that is coupled to processor 101 provides the processor 101 with a high-speed memory that may be used in the execution of computer program instructions by the processor 101. Accordingly, system memory 105 may include memory components, such as such as static RAM (SRAM), dynamic RAM (DRAM), NAND Flash memory, suitable for supporting high-speed memory operations by the processor 101. In certain embodiments, system memory 105 may combine both persistent, non-volatile memory and volatile memory. In certain embodiments, the system memory 105 may be comprised of multiple removable memory modules.

IHS 100 utilizes a chipset 103 that may include one or more integrated circuits that are connect to processor 101. In the embodiment of FIG. 1, processor 101 is depicted as a component of chipset 103. In other embodiments, all of chipset 103, or portions of chipset 103 may be implemented directly within the integrated circuitry of the processor 101. Chipset 103 provides the processor(s) 101 with access to a variety of resources accessible via bus 102. In IHS 100, bus 102 is illustrated as a single element. Various embodiments may utilize any number of separate buses to provide the illustrated pathways served by bus 102.

In various embodiments, 100 may include one or more I/O ports 116 the support removeable couplings with various types of peripheral external devices. For instance, I/O 116 ports may include USB (Universal Serial Bus) ports, by which a variety of external devices may be coupled to IHS 100. I/O ports 116 may include various types of physical I/O ports accessible to a user via the enclosure of the IHS 100, where these physical I/O ports support couplings that may connect IHS 100 with external devices and systems, such as couplings established with USB compatible devices via USB ports supported by IHS 100.

As illustrated, a variety of resources may be coupled to the processor(s) 101 of the IHS 100 through the chipset 103. For instance, chipset 103 may be coupled to a network interface 109 that may support different types of network connectivity. In certain embodiments, IHS 100 may include one or more Network Interface Controllers (NIC), each of which may implement the hardware required for communicating via a specific networking technology, such as BLUETOOTH, Ethernet and mobile cellular networks (e.g., CDMA, TDMA, LTE). As illustrated, network interface 109 may support network connections by wired network controllers 122 and wireless network controller 123. Each network controller 122, 123 may be coupled via various buses to the chipset 103 of IHS 100 in supporting different types of network connectivity, such as the network connectivity utilized by the operating system of IHS 100.

Chipset 103 may also provide access to one or more display device(s) 108, 113 via graphics processor 107. In certain embodiments, graphics processor 107 may be comprised within a video card, graphics card or within an embedded controller installed within IHS 100. In certain embodiments, graphics processor 107 may be integrated within processor 101, such as a component of a system-on-chip. Graphics processor 107 may generate display information and provide the generated information to one or more display device(s) 108, 113 coupled to the IHS 100. The one or more display devices 108, 113 coupled to IHS 100 may utilize LCD, LED, OLED, or other display technologies. Each display device 108, 113 may be capable of receiving touch inputs such as via a touch controller that may be an embedded component of the display device 108, 113 or graphics processor 107, or may be a separate component of IHS 100 accessed via bus 102. IHS 100 may support one or more integrated display devices 108, such as a display integrated into a laptop, tablet, 2-in-1 convertible device, or mobile device. IHS 100 may also support use of one or more external displays 113, such as external monitors that may be coupled to IHS 100 via various types of couplings, such as by connecting a cable from the external display 113 to an external I/O port 116 of the IHS 100. In some embodiments, power to graphics processor 107, integrated display device 108 and/or external display 133 may be turned off, or configured to operate at minimal power levels, in response to IHS 100 entering a low-power or reduced-power mode. As described in additional detail below, in certain embodiments, IHS 100 may be configured to place integrated display device 108 and/or external display 133 in a low-power or reduced-power mode in response to detecting specific lid state transitions resulting from reconfiguration of IHS 100 by a user. In some embodiments, IHS 100 may be similarly configured to dim the display outputs or to terminate outputs to integrated display device 108 and/or external display 133 in response to detecting specific lid state transitions.

Chipset 103 also provides processor 101 with access to one or more storage devices 119. In various embodiments, storage device 119 may be integral to the IHS 100, or may be external to the IHS 100. In certain embodiments, storage device 119 may be accessed via a storage controller that may be an integrated component of the storage device. Storage device 119 may be implemented using any memory technology allowing IHS 100 to store and retrieve data. For instance, storage device 119 may be a magnetic hard disk storage drive or a solid-state storage drive. In certain embodiments, storage device 119 may be a system of storage devices, such as a cloud drive accessible via network interface 109.

As illustrated, IHS 100 also includes a BIOS (Basic Input/Output System) 117 that may be stored in a non-volatile memory accessible by chipset 103 via bus 102. Upon powering or restarting IHS 100, processor(s) 101 may utilize BIOS 117 instructions to initialize and test hardware components coupled to the IHS 100. The BIOS 117 instructions may also load an operating system for use by the IHS 100. The BIOS 117 provides an abstraction layer that allows the operating system to interface with the hardware components of the IHS 100. The Unified Extensible Firmware Interface (UEFI) was designed as a successor to BIOS. As a result, many modern IHSs utilize UEFI in addition to or instead of a BIOS. As used herein, BIOS is intended to also encompass UEFI.

In certain embodiments, chipset 103 may utilize one or more I/O controllers 110 that may each support hardware components such as user I/O devices 111. For instance, I/O controller 110 may provide access to one or more user I/O devices 110 such as a keyboard, mouse, touchpad, touchscreen, microphone, speakers, camera and other input and output devices that may be coupled to IHS 100. Each of the supported user I/O devices 111 may interface with the I/O controller 110 through wired or wireless connections.

As illustrated, certain IHS 100 embodiments may utilize a sensor hub 114 capable of determining the relative orientation and movement of IHS 100. For instance, sensor hub 114 may utilize inertial movement sensors 115, that may include accelerometer, gyroscope and magnetometer sensors and are capable of determining the current orientation and movement of IHS 100 (e.g., IHS 100 is motionless on a relatively flat surface, IHS 100 is being moved irregularly and is likely in transport, the hinge of IHS 100 is oriented in a vertical direction). In certain embodiments, sensor hub 114 may also include capabilities for determining a location and movement of IHS 100 based on triangulation of network signal and based on network information provided by the operating system or a network interface 109. In some embodiments, sensor hub 114 may support additional sensors, such as optical, infrared and sonar sensors, that may provide support for xR (virtual, augmented, mixed reality) sessions hosted by the IHS 100 and may be used by sensor hub 114 provide an indication of a user's presence near IHS 100, such as whether a user is present and facing the integrated display 108.

In embodiments where IHS 100 may support multiple physical configurations, such as the convertible laptop described below with regard to FIGS. 2A-H, sensor hub 114 may utilize one or more mode sensors 112 that collect readings that may be used by sensor hub 114 in determining the current posture in which the IHS 100 is physically configured. In certain embodiments, such posture determinations may be additionally made using the movement and orientation information provided by inertial movement sensors 115. In laptop and convertible laptop embodiments, embedded controller 120 may utilize a lid position sensor 121 to determine the relative angle between the two panels of the laptop in order to determine the mode in which IHS 100 is physically configured. In such embodiments, lid position sensor 121 may measure the angle of rotation of the hinge that connects the base panel and lid panel of IHS 100. In some embodiments, embedded controller 120 may provide collected lid position information, such as the hinge angle, to sensor hub 114 for use in determine the posture in which IHS 100 is configured. In some embodiments, sensor hub 114 may interface directly with lid position sensor 121 in determining hinge angle information Sensor hub 114 may determine the posture of IHS 100 based, at least in part, on the angle of rotation of the hinge of IHS 100 from a closed position. A first range of hinge angles from a closed position may indicate a laptop posture, a second range of hinge angles may indicate a landscape posture and a third range of angles may indicate a tablet posture. Sensor hub 114 may additionally utilize orientation and movement information collected from inertial movement sensors 115 to further determine the posture in which the IHS 100 is physically configured. For instance, if the sensor hub 114 determines the IHS 100 is configured with a hinge angle of a laptop configuration, but the IHS 100 is oriented on its side, the IHS may be determined to be in a book mode. If the IHS 100 is determined to be tilted such that the hinge is oriented between horizontal and vertical, the user's face is detected to be facing the integrated display, and the IHS is experiencing slight movement, the sensor hub 114 may determine that the IHS 100 is being used in a book posture. Sensor hub 114 may determine that IHS 100 is opened to a 180 degree hinge angle and lies on a flat surface, thus indicating IHS 100 it is being used in a landscape posture. The sensor hub 114 may similarly determine IHS 100 is in a tent configuration, such as illustrated in FIG. 2B, based on detecting a hinge angle within a defined range, such as between 300 and 345 degrees, and also detecting an orientation of IHS 100 where the hinge is aligned horizontally and is higher than both of the panels of IHS 100.

In certain embodiments, sensor hub 114 may be an independent microcontroller or other logic unit that is coupled to the motherboard of IHS 100. In such embodiments, sensor hub 114 may communicate with various sensors and chipset 103 of processor 101 via a bus connection such as an Inter-Integrated Circuit (I2C) bus or other suitable type of multi-master bus connection. In certain embodiments, sensor hub 114 may be a component of an integrated system-on-chip incorporated into processor 101 and may utilize an I2C bus for communicating with sensors, such as the mode sensor 112, inertial measurement sensors 115 and sensors used for determining a user's presence near the IHS 100. Sensor hub 114 may collect and processes data from such sensors using data fusion techniques in order to determine the posture in which IHS 100 has been configured.

Some IHS 100 embodiments may utilize an embedded controller 120 that may be a motherboard component of IHS 100 and may include one or more logic units. In certain embodiments, embedded controller 120 may operate from a separate power plane from the main processors 101 and thus the operating system functions of IHS 100. Embedded controller 120 may also implement operations for interfacing with a power adapter 124 in managing power for IHS 100. Such operations may be utilized to determine the power status of IHS 100, such as whether IHS 100 is operating from battery power or is plugged into an AC power source. In addition, operations of embedded controller 120 may provide battery status information, such as the current charge level of the batteries of IHS 100. Firmware instructions utilized by embedded controller 120 may be used to operate a secure execution environment that may include operations for providing various core functions of IHS 100, such as power management and management of certain operating modes in which IHS 100.

In management of operating modes of IHS 100, embedded controller 120 may implement operations for detecting certain changes to the physical configuration of IHS 100 and managing the modes corresponding to different physical configurations of IHS 100. For instance, where IHS 100 is a laptop computer or a convertible laptop computer, embedded controller 120 may receive inputs from a lid position sensor 121 that may detect whether the two sides of the laptop have been latched together to a closed position. In response to lid position sensor 121 detecting latching of the lid of IHS 100, embedded controller 120 may initiate operations for shutting down IHS 100 or placing IHS 100 in a low-power mode. Embedded controller 120 may rely on sensor hub 114 in order to process some of the inputs collected by the embedded controller 120 and the sensor hub 114. In some embodiments, embedded controller 120 and sensor hub 114 may communicate directly, including during low-power modes, via an out-of-band signaling pathway 125 that allows the processing of inputs to be shared in various combinations between these two components.

IHS 100 may support the use of various power modes. In some embodiments, the power modes of IHS 100 may be implemented through operations of the embedded controller 120 and the operating system of the mobile IHS 100. In various embodiments, mobile IHS 100 may support various reduced power modes in order to reduce power consumption and/or conserve battery power when mobile IHS 100 is not actively in use. The power modes may include a fully on state in which the processor(s) 101 are fully powered, any storage devices 119 are powered and/or connected, any integrated displays 108 are fully powered, any previously configured network connections are initiated, and all other available components of mobile IHS 100 are also fully operational. In a fully off power mode, processor(s) 101 are powered off, any integrated storage devices 119 are powered off and any remoted storage devices 119 are disconnected, any integrated displays 108 are powered off, network connections are disconnected, and power to all other components of mobile IHS 100 is off.

In an intermediate low-power mode, various components of mobile IHS 100 may be powered down, but mobile IHS 100 remains ready for near-immediate use. For instance, in certain intermediate reduced-power states, processor(s) 101 remain powered, network connections remain connected, local and remote storage 119 remain powered and/or connected. However, in such low-power modes certain components of mobile IHS 100 may be powered down, including integrated displays 108, output to any external displays, and certain peripheral devices coupled to mobile IHS 100. In various embodiments, different combinations of devices and resources may be powered and available during different low-power states.

In another low-power mode, that may be referred to as a standby power state, sleep state or hibernation state, various types of state information may be stored to storage devices 119 and all but a selected set of components and low-power functions of mobile IHS 100 are shut down. For instance, the main components of the operating system may be shut down, processor(s) 101 may be powered down, storage devices 119 are powered down and/or disconnected, any integrated displays 108 are powered down and connections to external displays are disconnected, and any network connections are disabled. However, in some embodiments, certain low-power operations may continue in this low-power state that may otherwise be indistinguishable from a fully off state to the user. As described, in certain embodiments, low-power functions operating during a standby power state may include operations performed by sensor hub 114 and/or embedded controller 120 that may be separately powered from processor(s) 101. In addition, in certain embodiments, processor(s) 101 may include a system-on-chip or other logic unit capability that may be separately powered from the processor core and used to implement certain low-power operations during a standby power state. In some embodiments, the operating system of mobile IHS 100 may support the operation of certain low-power functions using this low-power processing capability.

In various embodiments, an IHS 100 does not include each of the components shown in FIG. 1. In various embodiments, an IHS 100 may include various additional components in addition to those that are shown in FIG. 1. Furthermore, some components that are represented as separate components in FIG. 1 may in certain embodiments instead be integrated with other components. For example, in certain embodiments, all or a portion of the functionality provided by the illustrated components may instead be provided by components integrated into the one or more processor(s) 101 as a systems-on-a-chip.

Figure 2A:
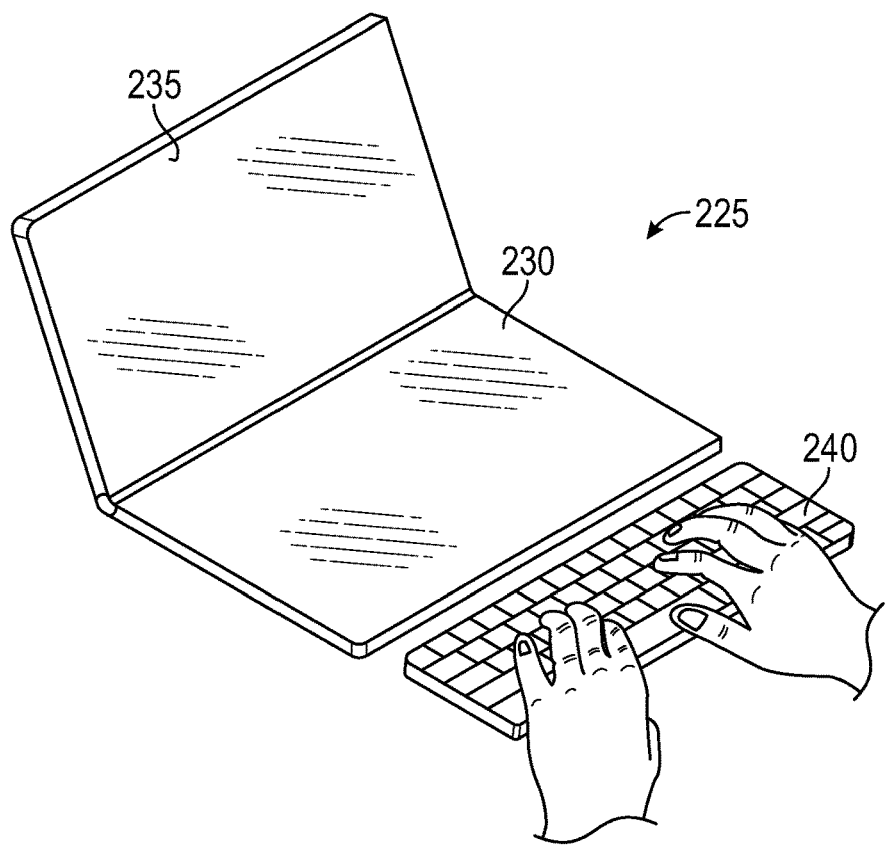
FIG. 2A is an illustration of a convertible IHS according to various embodiments configured in a lid state corresponding to a laptop posture.
Figure 2B:
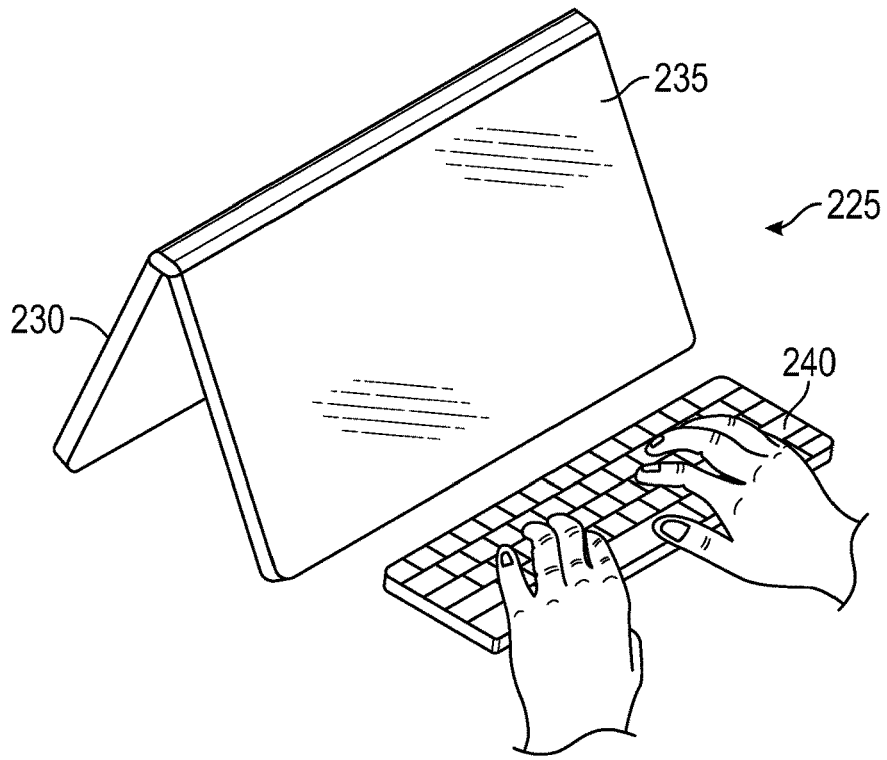
FIG. 2B is an illustration of a convertible IHS according to various embodiments configured in a lid state corresponding to a tent posture.

FIG. 2A is an illustration of a convertible IHS 225 that may be configured according to embodiments in a lid state corresponding to a laptop posture. As described in additional detail with regard to the embodiment of FIG. 3, certain operations of IHS 225 may initiated based on lid state transitions of a convertible IHS 225, such as transitioning convertible IHS 225 to or from the illustrated laptop posture. The IHS 225 of FIG. 2A is a convertible laptop 225 that is comprised of two panels 230 and 235 that may be rotated relative to each other about a hinge at a hinge angle supporting the illustrated laptop posture. In the embodiment of FIG. 2A, the IHS rests on a base panel 230 and a display panel (i.e., lid) 230 is rotated to face the user of the convertible IHS 225. By rotating the panels 230 and 235 at other hinge angles, a variety of additional postures may be supported. These various postures of a convertible IHS 225 may also be referred to as modes or configurations of the IHS.

In some embodiments, both panels 230 and 235 of the convertible IHS 225 may include integrated displays, such as integrated display device 108 described with regard to the IHS 100 of FIG. 1. As illustrated, convertible laptop 225 may utilize an external keyboard 240 that may be used on a tabletop or desk surface while using both panels 230, 235 as display devices. In some embodiments, a soft keyboard may be displayed by the base panel 230 such that no external keyboard 240 is necessary. As with a traditional, non-convertible laptop, a mouse or other pointing device may be utilized to operate the convertible laptop 225 while it is configured in the laptop mode of FIG. 2A. In addition, convertible IHS 225 may also support the use of additional pointing devices such as a stylus or pen via which a user may provide inputs to touchscreen displays integrated in the panels 230 and 235 of the convertible IHS 225.

Figure 2C:
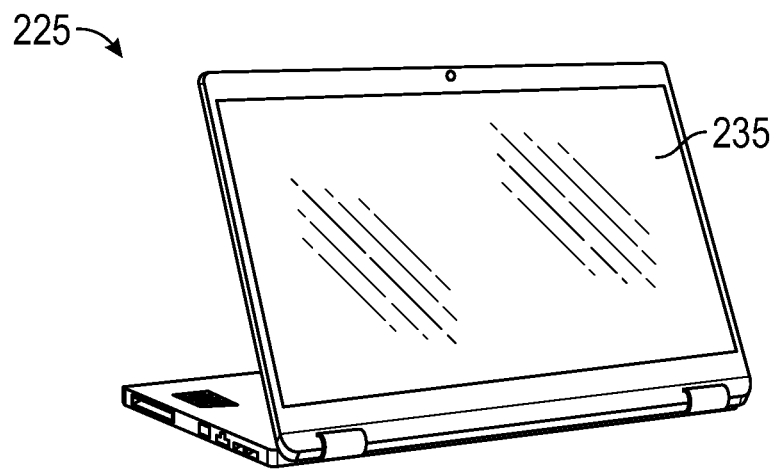
FIG. 2C is an illustration of a convertible IHS according to various embodiments configured in a lid state corresponding to a kickstand posture.
Figure 2D:
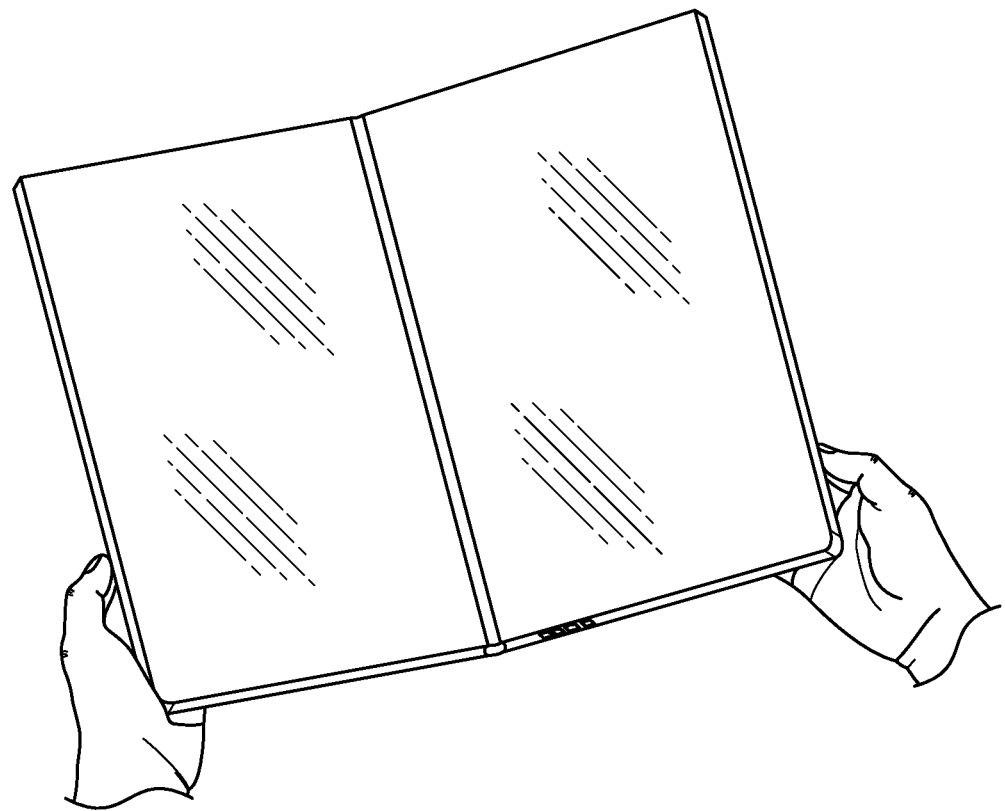
FIG. 2D is an illustration of a convertible IHS according to various embodiments configured in a lid state corresponding to a book posture.

FIG. 2B is an illustration of a lid state corresponding to an additional posture supported by the convertible laptop 225 of FIG. 2A. In FIG. 2B, the convertible laptop 225 is propped in a "tent" postures in which the display panel (i.e., lid) 235 is being used as a display and the base panel 230 is disabled and used to prop the display panel 235 such that it faces the user. In the tent posture, the keyboard 240 and/or various pointing devices may be used on a tabletop or desk surface in view of the display panel 235. In FIG. 2C, the convertible IHS 225 is configured in a lid state corresponding to a posture that may be referred to as a "kickstand" posture. In a kickstand posture, the convertible IHS 225 rests on the disabled base panel 230 and the display panel 235 (i.e., lid) is rotated past 270 degrees from the closed position such that the integrated display of panel 235 faces the user. In such a configuration, the user may operate the convertible laptop 225 using a removable keyboard 240 as well as using various pointing devices. In FIG. 2D, the convertible IHS 225 is configured in lid state corresponding to "book" posture in which the panels 230, 235 may be opened to a hinge angle in an approximate range between 85 and 180 degrees such that the integrated displays face the user once the IHS 225 is rotated as illustrated in FIG. 2D. Configured in this posture, IHS 225 may held by a user like a traditional book or may stand on a flat surface with the hinge oriented vertically, in the same manner as a bifold picture frame.

Figure 2E:
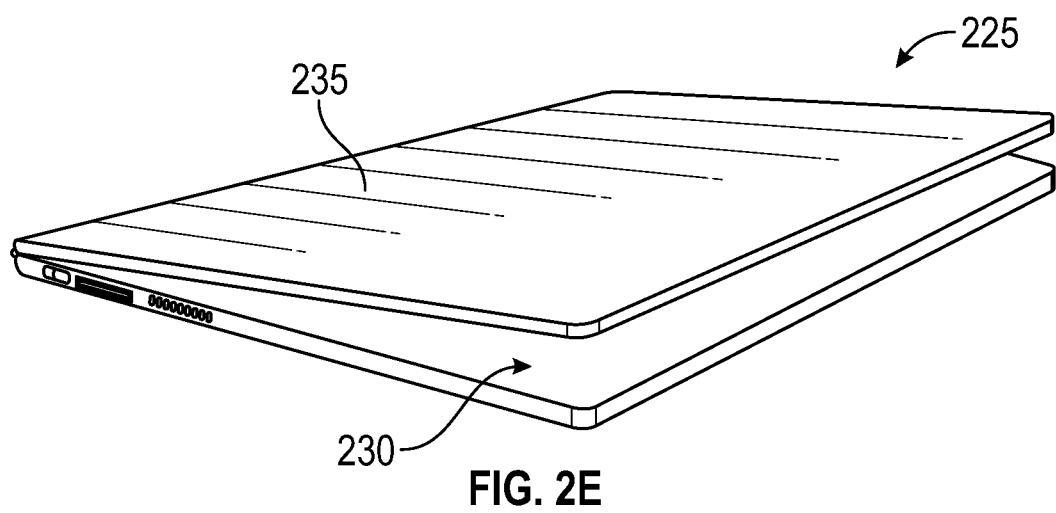
FIG. 2E is an illustration of a convertible IHS according to various embodiments configured in a lid state corresponding to a partially-closed laptop posture.

As described, current laptop IHSs typically support a single mode of operation for all hinge angles. Embodiments support multiple modes of operation for different hinge angles of an IHS, thus providing a capability for specifying additional postures as well as operations corresponding to transitions to or from these postures. FIG. 2E illustrates IHS 225 configured in a partially-closed laptop posture in which the lid panel 235 and base panel 230 are not latched, but lid panel 235 is only opened to a significantly acute hinge angle, such as within range between 5 and 15 degrees, that does not readily allow viewing of the displays integrated into one or both of the panels 230 and 235. As described in additional detail with regard to FIG. 3, upon detecting a lid state transition in which IHS 225 is converted from another posture, such as the fully open laptop posture of FIG. 2A, to this partially-closed laptop posture of FIG. 2E, specific operations may be conducted that may transition IHS 225 to a privacy mode of operations.

Figure 2F:
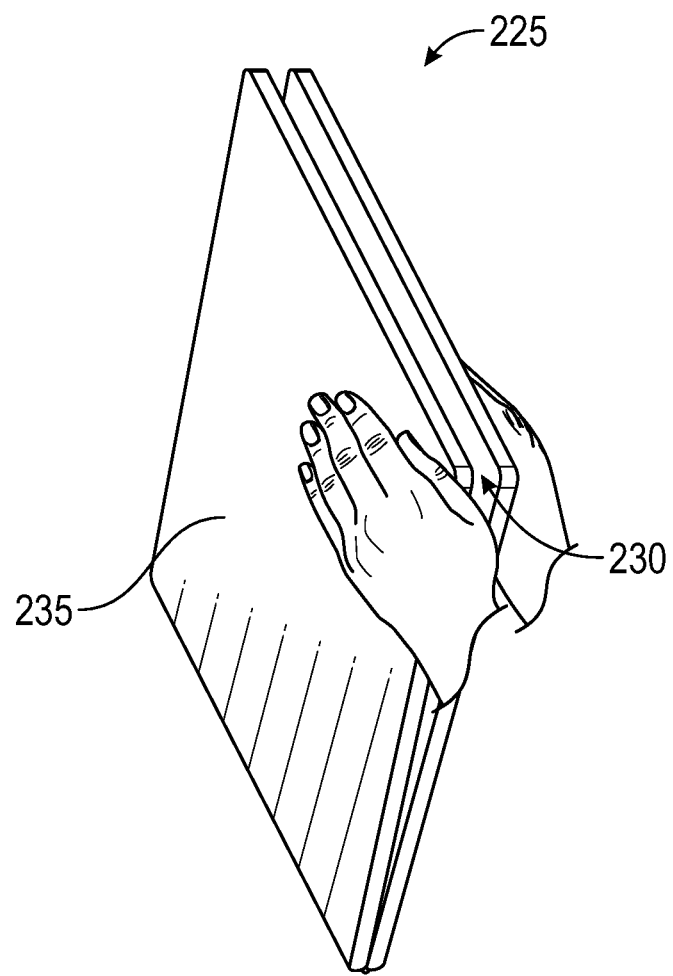
FIG. 2F is an illustration of a convertible IHS according to various embodiments configured in a lid state corresponding to a partially-closed book posture.

FIG. 2F illustrates a similar partially-closed book posture in which IHS 225 is oriented in the same manner as a book posture, but the two panels 230, 235 are configured with a significantly acute hinge angle, such as within a range between 5 and 15 degrees, that does not readily allow viewing of either of the displays integrated in the panels 230, 235. Accordingly, an IHS 225 configured according to embodiments may conduct operations that configure IHS 225 in a privacy mode upon detecting a transition from another posture to this partially-closed book posture of FIG. 2F.

Figure 2G:
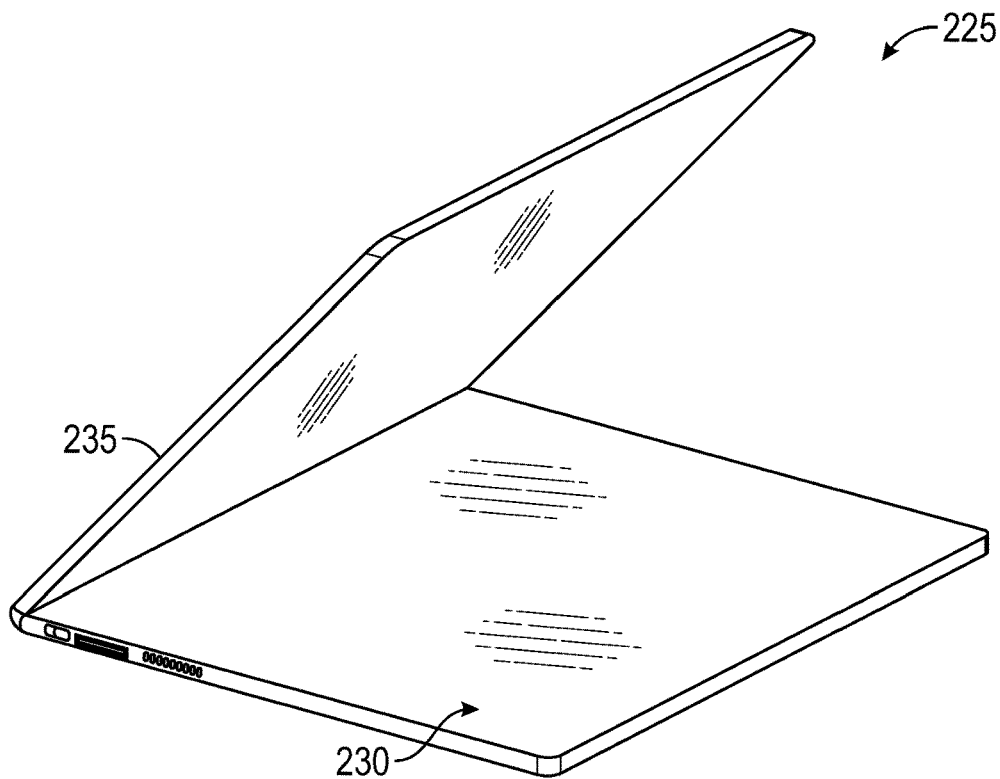
FIG. 2G is an illustration of a convertible IHS according to various embodiments configured in a lid state corresponding to a partially-open laptop posture.
Figure 2H:
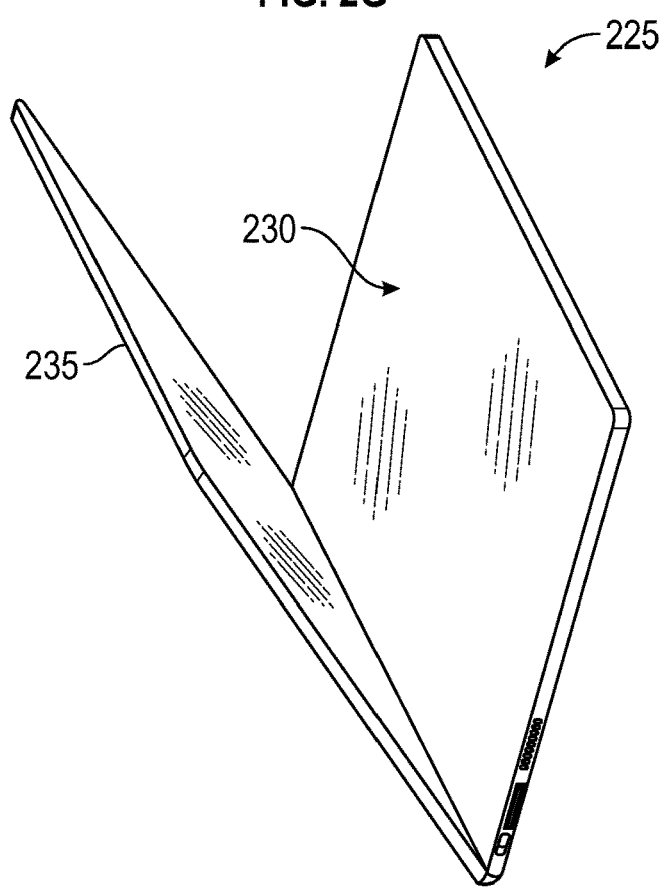
FIG. 2H is an illustration of a convertible IHS according to various embodiments configured in a lid state corresponding to a partially-open book posture.

FIG. 2G illustrates IHS 225 configured in a partially-open laptop posture in which the lid panel 235 and base panel 230 are not latched and lid panel 235 is opened to a less acute hinge angle than the partially-closed posture of FIG. 2E, such as within range between 30 and 60 degrees, that also does not readily allow viewing of the displays integrated into one or both of the panels 230 and 235, but to a lesser degree than the partially-closed posture of FIG. 2E. Accordingly, in some embodiments lid state transitions to the partially-open laptop posture of FIG. 2G may result in operations that reduce the power consumption of IHS 100, such as dimming integrated displays 108 and configuring processor 101 in a reduced power state, that allow use of IHS 100 to be quickly resumed and without the additional operations that may be associated with a privacy mode. FIG. 2H illustrates a similar partially-open book posture in which IHS 225 is oriented in the same manner as a book posture of FIG. 2F, but the two panels 230, 235 are configured with a less acute hinge angle, such as within a range between 30 and 60 degrees. As with the partially-open laptop posture of FIG. 2G, transitions to the partially-open book posture of FIG. 2H may result in operations that reduce the power consumption of IHS 100 but does not conduct operations associated with a privacy mode of operations.

An IHS 225 configured according to embodiments may support various additional postures. Configured in a landscape posture, the panels 230, 235 of convertible IHS 225 may be opened to a 180 degree hinge angle such that IHS 225 may be placed on a flat surface such as a desk or table, or IHS 225 may be propped upwards in a stand or dock such that the displays are tilted towards the user. An external keyboard and various pointing devices may be utilized while the convertible IHS is in a landscape posture. In another tablet posture, the base panel may be disable and the display panel is rotated open to its fullest extent, allowing the IHS 225 to be placed on a surface, propped upwards or held by a user. In this table posture, inputs may be accepted via a touchscreen integrated in the display panel.

Figure 3:
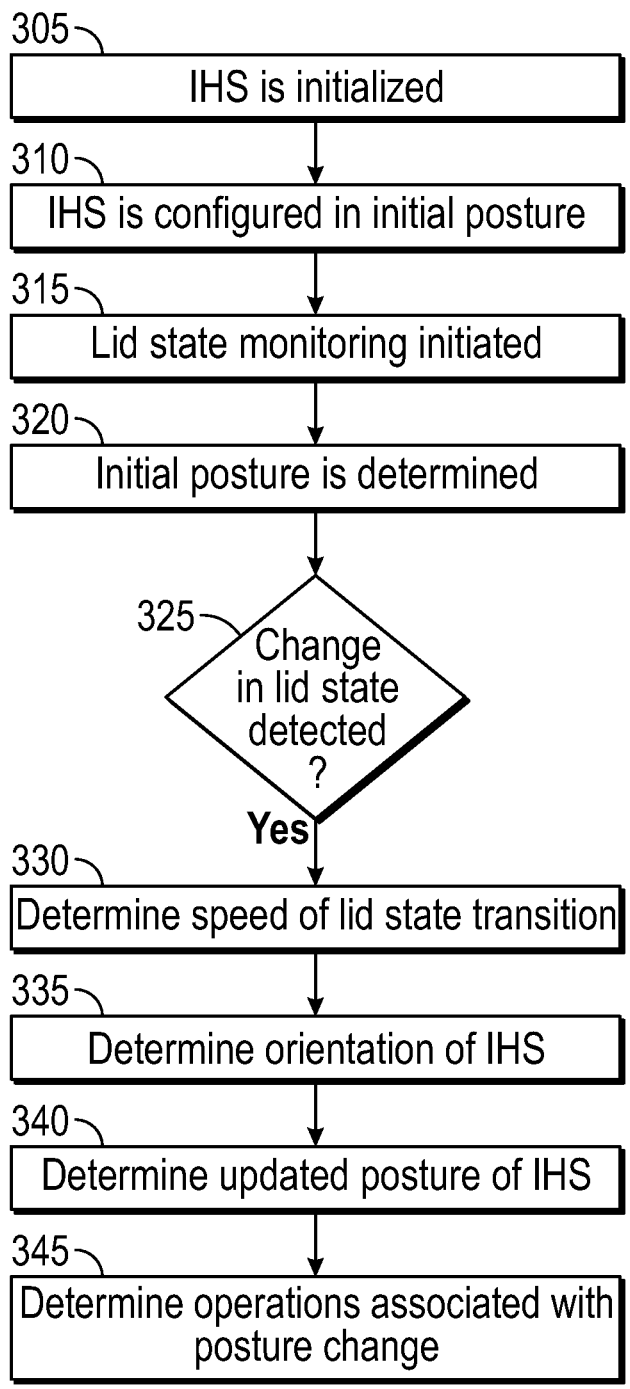
FIG. 3 is a flow chart diagram illustrating certain steps of a process according to various embodiments for performing IHS operations in response to detected changes in the lid state of the IHS.

FIG. 3 is a flow chart diagram illustrating certain steps of a process according to various embodiments for performing IHS operations in response to detected changes in the lid state of the IHS. As described, an IHS including a lid panel and a base panel may support multiple different physical configurations that may be referred to as postures. In some scenarios, the process of FIG. 3 may begin with such an IHS physically configured in a closed position, with the lid panel latched to the base panel. However, in other scenarios, the process of FIG. 3 may begin with the an IHS physically configured in other postures, such as those illustrated in FIGS. 2A-H. Configures in an initial posture, at block 305, the IHS is initialized, such as by the user pressing a power button or via another input.

In some scenarios, a user may physically configure the IHS during its initialization, such as during the time required to boot the operating system and initiate default software applications. Accordingly, while initialization of the IHS is ongoing, at block 310, the user may configure the IHS in an initial posture. For instance, when using a laptop, the user may open and rotate the lid panel until the screen of the display integrated within the lid panel faces the user. In other instances that utilize a convertible laptop, the user may physically configure the convertible laptop in any of the supported physical configurations, such as those described with regard to FIGS. 2A-H.

With the IHS initialized, at block 315, one or more processes for monitoring the lid state of the IHS may be initiated. As described in additional detail with regard to FIG. 4, an IHS may support configurable operations in response to lid state transitions, where these operations are implemented using an operating system process that receives lid state information from components of the IHS, such as the sensor hub 114 and/or the embedded controller 120 of the IHS 100 of FIG. 1. Upon initiating such lid state monitoring processes within the operating system and within the sensor hub and/or embedded controller, at block 320, the initial posture of the IHS is determined. As described, the posture of an IHS may be determined based on the lid state and/or based on additional sensor data describing the orientation or other position information of the IHS and of the user of the IHS. In various scenarios, use of the IHS may proceed for any duration of time with the IHS configured in this initial posture.

At block 325, a change in the lid state of the IHS is detected. As described, an IHS may include one or more sensors used to determine lid state of the IHS. For instance, sensors may detect when the lid panel of the IHS is latched to the base panel such that the IHS is in a closed position. When the lid panel is unlatched, these sensors may also detect the angle of rotation of the hinge connecting the lid panel and the base panel. Based on such sensor data, any changes to the lid state may be detected, thus providing an indication that the user has reconfigured the IHS to a new posture. In embodiments where the IHS is a laptop, a detected change in lid state may reflect the user rotating lid panel between a fully-open laptop posture, such as illustrated in FIG. 2A, and a partially-closed laptop posture, such as illustrated in FIG. 2E. In embodiments where the IHS is a convertible laptop, a detected change in lid state may reflect the user reconfiguring the lid panel and base panel between the postures illustrated in FIGS. 2A-H.

In certain embodiments, the speed of a detected lid state change may be determined at block 330. For instance, in addition to detecting a change in the angle of rotation of the hinge connecting the lid panel and base panel of an IHS, the speed of such a change may be characterized based on the rate of change of the angle of rotation, the time duration of the change of the angle of rotation and/or various other measures of the velocity of the detected change in lid state. In some embodiments, the speed at which a user changes the lid state of an IHS may be used to trigger specific operations for configuring IHS in a privacy mode, such as minimizing windows displayed by the operating system of the IHS and terminating certain network connections.

In some embodiments, a change in lid state may be determined based on a detected pattern of changes in the hinge angle. For instance, in addition to detecting changes in the lid angle, the sensors of the IHS may be configured to detect a sequence of small, rapid movements of the lid angle, such as from the user jiggling the lid panel back and forth about the hinge. The user may then continue movement of the lid panel to a range of angles corresponding to a new lid state or may return the lid panel back to the prior lid state. For instance, with the IHS configured in a fully-open position, the user may jiggle the lid panel before moving it to a partially-closed position, or returning it to a fully-open position. If such a movement pattern is detected, it may be a specific set of IHS operations may be associated with such a transition. For instance, detecting a movement pattern may trigger privacy mode operations in the same manner as may be triggered based on the speed of transition in lid states. Different lid movement patterns may be associated with different IHS operations such that lid movement patterns may serve as types of gestures that may be used to signal specific IHS operations.

In convertible IHS scenarios, a change in the lid state of the IHS may also be accompanied by a change in the orientation of the IHS. For instance, in a scenario where a convertible IHS is configured in a tent posture, such as illustrated in FIG. 2B, the user may partially close the lid panel and rotate the IHS for use in a book posture, such as illustrated in FIG. 2D. Accordingly, as described with regard to the IHS of FIG. 1, information from various sensors may be evaluated in order to determine the orientation and any movement of the IHS, the hinge angle of the IHS and/or the orientation of the IHS relative to the user. Based on the collected sensor information, at block 240, the updated posture of the IHS may be determined.

Based on the determined change from the initial posture to the updated posture, at block 345, operations of the IHS associated with this particular change in postures may be determined. Rather than determining IHS operations based solely on the current posture in which an IHS is physically configured, embodiments may determine IHS operations based on specific transitions between postures supported by the IHS. For instance, in a scenario where an IHS is initially in a book posture, such as illustrated in FIG. 2D, and is reconfigured in a partially-closed or partially-open book posture, such as illustrated in FIGS. 2F and 2H, respectively, IHS operations may be triggered that pause any multimedia players currently in use and reconfigure the displays of the IHS in a low-power mode. In another illustrative example, the IHS may be initially configured in a laptop posture, such as illustrated in FIG. 2A, and is reconfigured in a partially-closed or a partially-open laptop posture, such as illustrated in FIGS. 2E and 2G, respectively. In response to such reconfigurations, any multimedia players currently in use may paused and the IHS may be transitioned to a low-power mode in which the display(s) of the IHS are disabled.

In some embodiments, the speed of such transitions between postures may also be considered when determining IHS operations to be performed in response to detecting a lid state transition. For instance, in the preceding example, the IHS is reconfigured from a laptop posture to a partially-closed laptop posture. If such a transition is detected to have been completed quickly, the IHS may be transitioned to a privacy mode of operations, such as by pausing any multimedia players currently in use, muting any audio output, terminating any outputs to external displays, and minimizing all active user interfaces displayed in the desktop of the IHS. In this manner, the speed of the transition may be used to detect a scenario in which the user is not transitioning to a low-power mode, but is instead initiating temporary privacy procedures. In this same manner, the process of FIG. 3 may be utilized to restore the multimedia outputs and the user's desktop upon detecting a change back to the laptop posture. Such privacy modes may be similarly triggered by detecting rapid transitions from one posture to the next, such as a rapid transition from the book posture of FIG. 2D to the partially-closed book posture of FIG. 2F.

Figure 4:
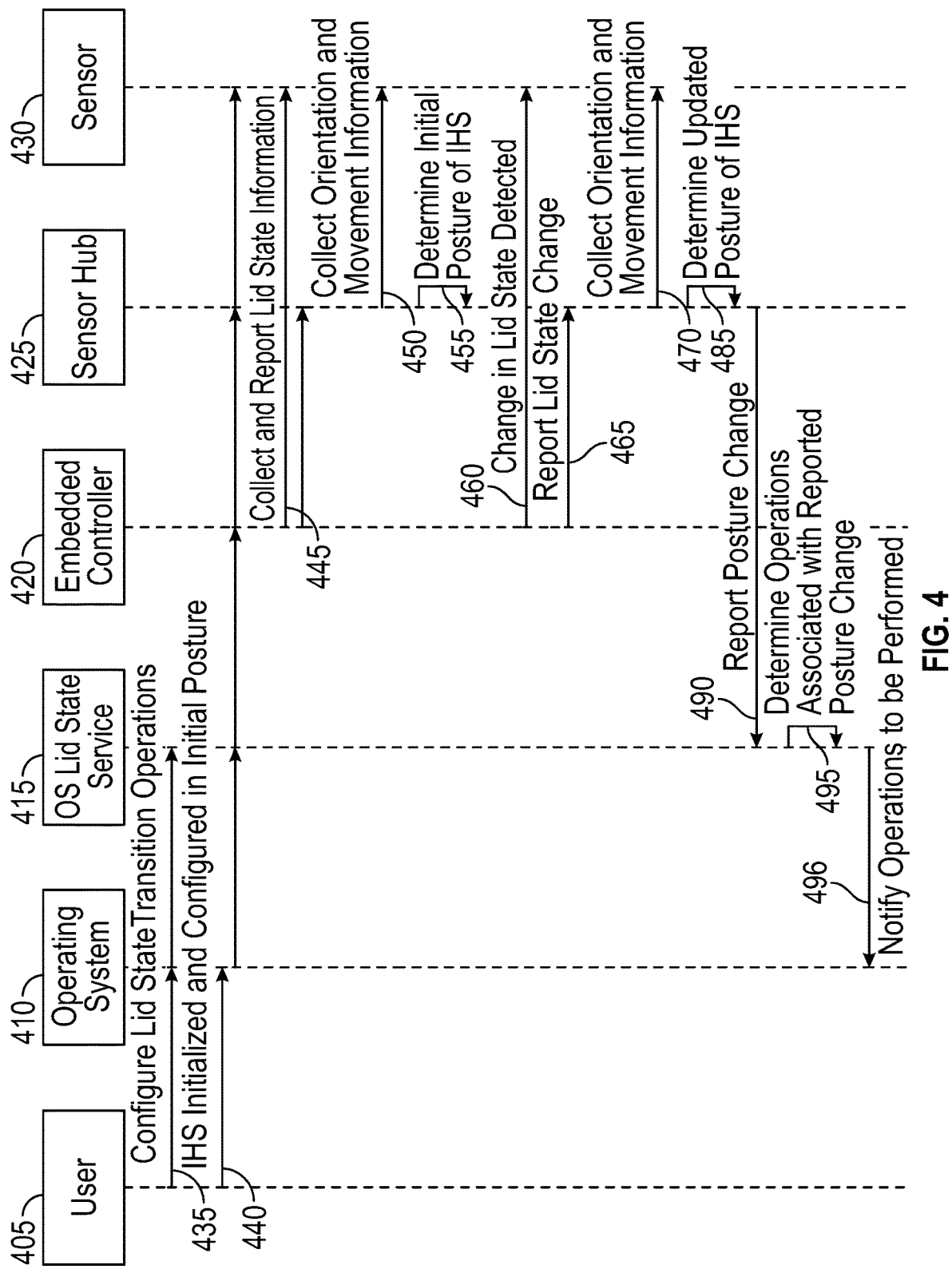
FIG. 4 is a sequence diagram illustrating certain responsibilities of components of an IHS configured according to certain embodiments for performing IHS operations in response to detected changes in the lid state of the IHS.

FIG. 4 is a sequence diagram illustrating certain responsibilities of components of an IHS configured according to certain embodiments for performing IHS operations in response to detected changes in the lid state of the IHS. As described, embodiments support the ability to configure specific operations of an IHS in response to detecting specific changes in the posture of the IHS. In support of configuring such operations, at 435, the user 405 of the IHS may utilize interfaces provided via the operating system 410 in order to configure specific IHS responses by a lid state operations service 415. For instance, the user 405, may configure the lid state operations service 415 to implement specific privacy operations, such as pausing multimedia players, minimizing user interfaces, muting audio and terminating output to external displays, in response to detecting a specific lid state transition. As described, the configuration of IHS operations may also account for the speed at which a detected lid state transition was made by the user.

With responses to lid state transitions configured, at 440, the user 405 configures the IHS in an initial posture and begins use of the IHS. As described, the initialization of the IHS may also initiate one or more processes for detecting the lid state of the IHS. For instance, an embedded controller 420 of the IHS may implement operations for monitoring the angle of rotation of the hinge connecting the lid panel and base panel of the IHS. At 445, the embedded controller 420 collects initial lid state information, such as querying one or more sensors 430 to determine the hinge angle, and reports the initial lid state to the sensor hub 425. At 450, the sensor hub 425 collects readings from sensors 430 to determine the physical orientation of the IHS and any movement of the IHS, and in some scenarios, the presence of the user relative the display(s) of the IHS. Based on the reported lid state and collected orientation information, at 455, sensor hub 425 determines the initial posture in which the IHS has been configured.

Configured in this initial posture, the user 405 may operate the IHS for a duration of time that may range from minutes to hours. During such periods of use of the IHS, embedded controller 420 monitors for changes in the lid state of the IHS. As described, embedded controller 420 may determine changes in lid state, at 460, by monitoring sensors 430 that measure hinge angle of the IHS. Upon detecting any changes in the hinge angle, at 465, embedded controller 420 reports the lid state change to sensor hub 425. In response a reported change in the lid state, at 470, the sensor hub 425 may collect orientation and movement information from sensors 430 for use in determining, at 485, the posture of the IHS. In some scenarios, a posture change may be made without any change to the hinge angle. Accordingly, in such scenarios, a change in posture may be detected based on detected changes in the orientation of the IHS or detecting movement of the IHS.

As described with regard to FIGS. 2A-H, a user may configure certain IHSs, such as a convertible laptop, in various physical postures. As described with regard to FIG. 1, an IHS may utilize a sensor hub 425 that determines the posture in which an IHS has been physically configured by the user, such as the postures of the convertible laptop of FIGS. 2A-H. For instance, sensor hub 425 may utilize information collected from sensors 430 to determine a physical configuration of the IHS based on the reported hinge angle of the IHS in combination with sensor data describing the orientation of the IHS. For instance, sensor hub 425 may utilize inertial measurement sensors 430 in order to determine a physical orientation of the IHS that may be used to confirm or modify a posture indicated by the hinge angle. For instance, a hinge angle indicting a book mode configuration of an IHS, such as illustrated in FIG. 2D, may be confirmed by the sensor hub 425 based on the IHS being oriented on its side and tilted towards a user. A hinge angle indicating the IHS is configured in a landscape mode may be confirmed by the sensor hub 425 based on the IHS being oriented with both panels facing upwards while the IHS is on a flat surface. Similarly, a hinge angle indicating a tent mode may be confirmed by the sensor hub 425 based on the IHS being oriented with the hinge propped upwards relative to the two panels.

If the sensor hub determines, at 485, that the detected change in lid state or changes in orientation of the IHS correspond to a change in the posture of the IHS, such changes are reported, at 490, to a lid state service 415 running in the operating system 410 of the IHS. In some embodiments, the reported posture change may provide the lid state service 415 with the initial posture, the updated posture and characteristic information describing the change in postures, such as the lid angle and speed of the posture change. Based on the reported posture change information, at 495, the lid state service 415 may determine the IHS operations to be conducted in response to this particular posture change. As described, such responsive IHS operations may be configured by the user 405 through configuration operations supported by the lid state service 415.

In some embodiments, the sensor 430 information reported at 490 may include user presence information. As described with regard to FIG. 1, an IHS according to embodiments may include sensors, such as line of sight sensors, that may provide an indication of the user's presence near the IHS. In some instances, such sensors 430 may provide an indication regarding whether the user is facing a display of the IHS. In such embodiments, the reported user presence information may be utilized in determining, at 495, the operations to be performed in response to a lid state transition. For instance, if a user is not detected in proximity to the IHS, the IHS operations may include configuring the IHS in a reduced-power mode or configuring display and other I/O aspects of the IHS in a reduced-power mode.

In some embodiments, sensor 430 information reported at 490 may include battery state information, such as the current charge level of the batteries and whether AC power is currently available or the IHS is operating solely on battery power. In such embodiments, the reported battery and power information may be used in determining operations in response to a lid state transition. For instance, if the reported battery charge is below a specified threshold, IHS operations may be configured to preserve battery power in response to detecting a lid state transition. For instance, a transition from the book posture of FIG. 2D to the partially-open book posture of FIG. 2H with battery charge below a specified threshold may result in operations that turn off the output to the integrated displays, while battery charge above the specified threshold or availability of AC power may instead result in reducing the output, such as by dimming, of the integrated displays. Users may configure such operations, at 435, by specifying battery charge thresholds and the operations to be associated with lid state transitions under various power conditions. In some embodiments, rather than configure specific operations, users may instead specify preferences for conserving power or maximizing performance, where such preferences may be associated with ranges of available battery power.

In some embodiments, the operations associated with a lid state transition may be determined, at 495, based on machine learning operations. For instance, machine learning operations may process the sensor information reported at 490 as inputs, such as the hinge angle, the speed of the hinge angle transition, battery and power information, user presence information, movement information and orientation information. In addition, machine learning inputs may also include configurations made by users upon completing a specific lid state transition. For instance, a user may regularly configure the brightness of integrated displays upon transitioning an IHS to the kickstand posture of FIG. 2C. In other scenarios, a user may regularly mute all audio output upon transitioning an IHS to a partially-open laptop posture of FIG. 2G. Accordingly, machine learning techniques may generate outputs that specify IHS operations to be performed in response to detecting specific lid state transitions, where the generated outputs may included responses learned based on observations of user configurations.

Once the operations associated with a detected posture change have been determined, at 496, the lid state service 415 may trigger the operations corresponding to the posture change to be performed through commands supported by the operating system 410 of the IHS. For instance, if a change in configuration is detected from a book posture, such as illustrated in FIG. 2D, to a partially closed book posture, such as illustrated in FIG. 2F, commands supported by the operating system 410 may be invoked in order to place the mobile IHS in a low-power mode. If such a transition is determined to be a rapid change in posture, the lid state service 415 may additionally close all or some of the applications being run by IHS prior to placing the IHS in the low-power mode, such as closing a web browser, a reading application or a multimedia player, thus initiating a privacy mode of operations.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A method for configuring operations of an Information Handling System (IHS) comprising a lid panel and a base panel, the method comprising:
    determining a first lid state of the IHS based at least in part on a first angle of a hinge connecting the lid panel and the base panel of the IHS;
    detecting a transition of the angle of the hinge to a second angle;
    determining a second lid state of the IHS based at least in part on the second angle of the hinge;
    determining a physical orientation of the IHS, wherein the determination of the physical orientation is in addition to the determination of the first lid state and the second lid state;
    determining modifications to a plurality of outputs of the IHS based on the transition from the first lid state to the second lid state and further based on the physical orientation of the IHS that is in addition to the transition from the first lid state to the second lid state; and
    reconfiguring the plurality outputs of the IHS based on the determined modifications.

2. The method of claim 1, further comprising:
    determining a speed of the transition of the angle of the hinge to the second angle, wherein the modifications to the plurality of outputs are determined based on the speed of the transition of the angle of the hinge to the second angle.

3. The method of claim 2, wherein, if the speed of the transition of the hinge angle is above a threshold, the modifications to the plurality of outputs comprise terminating audio outputs by the IHS.

4. The method of claim 2, wherein, if the speed of the transition of the hinge angle is above a threshold, the modifications to the plurality of outputs comprise minimizing a plurality of interfaces displayed by the IHS.

5. The method of claim 2, wherein, if the speed of the transition of the hinge angle is above a threshold, the modifications to the plurality of outputs comprise terminating outputs to one or more displays utilized by the IHS.

6. The method of claim 2, wherein, if the speed of the transition of the hinge angle is below a threshold, the modifications to the plurality of outputs comprise pausing a plurality of multimedia outputs of the IHS.

7. The method of claim 1, wherein the orientation of the IHS is determined based on outputs provided by a sensor hub of the IHS.

8. The method of claim 7, wherein the on outputs provided by the sensor hub of the IHS that are used to determine the orientation of the IHS comprise a vertical or horizontal orientation of the hinge relative to the user.

9. An Information Handling System (IHS), comprising:
    a base panel;
    a lid panel coupled to the based panel via a hinge; and
    a logic unit configured by firmware instructions to:
        determine a first lid state of the IHS based at least in part on a first angle of the hinge;
        detect a transition of the angle of the hinge to a second angle;
        determine a second lid state of the IHS based at least in part on the second angle of the hinge;
        determine a physical orientation of the IHS, wherein the determination of the physical orientation is in addition to the determination of the first lid state and the second lid state; and
        notify a process of the operating system of the IHS of the transition from the first lid state to the second lid state and of the physical orientation of the IHS that is in addition to the transition from the first lid state to the second lid state;
    one or more processors; and
    a memory device coupled to the one or more processors, the memory device storing computer-readable instructions that, upon execution by the one or more processors, cause the system to:
        determine, based on the notification, modifications to a plurality of outputs of the IHS based on the transition from the first lid state to the second lid state and further based on the physical orientation of the IHS that is in addition to the transition from the first lid state to the second lid state; and
        reconfigure the plurality outputs of the IHS based on the determined modifications.

10. The IHS of claim 9, wherein the logic unit is further configured by firmware instructions to:
    determine a speed of the transition of the angle of the hinge to the second angle; and
    notify the operating system process of the operating system of the IHS of the speed of the transition of the angle of the hinge to the second angle.

11. The IHS of claim 10, wherein, if the notified speed of the transition of the hinge angle is above a threshold, the modifications to the plurality of outputs comprise terminating audio outputs by the IHS.

12. The IHS of claim 10, wherein, if the notified speed of the transition of the hinge angle is above a threshold, the modifications to the plurality of outputs comprise minimizing a plurality of interfaces displayed by the IHS.

13. The IHS of claim 10, wherein, if the notified speed of the transition of the hinge angle is above a threshold, the modifications to the plurality of outputs comprise terminating outputs to one or more displays utilized by the IHS.

14. The IHS of claim 10, wherein, if the notified speed of the transition of the hinge angle is below a threshold, the modifications to the plurality of outputs comprise pausing a plurality of multimedia outputs of the IHS.

15. The IHS of claim 9, wherein the orientation of the IHS is determined based on outputs provided by a sensor hub of the IHS.

16. The IHS of claim 15, wherein the on outputs provided by the sensor hub of the IHS that are used to determine the orientation of the IHS comprise a vertical or horizontal orientation of the hinge relative to the user.

17. A non-transitory computer-readable storage device having instructions stored thereon for configuring operations of an Information Handling System (IHS) comprising a lid panel and a base panel, wherein execution of the instructions by one or more processors of the IHS causes the one or more processors to:
   determine a first lid state of the IHS based at least in part on a first angle of the hinge;
   detect a transition of the angle of the hinge to a second angle;
   determine a second lid state of the IHS based at least in part on the second angle of the hinge;
   determine a physical orientation of the IHS, wherein the determination of the physical orientation is in addition to the determination of the first lid state and the second lid state; and
   notify a process of the operating system of the IHS of the transition from the first lid state to the second lid state and of the physical orientation of the IHS that is in addition to the transition from the first lid state to the second lid state, wherein a plurality outputs of the IHS are reconfigured based on the notification.

18. The computer-readable storage device of claim 17, wherein the instructions further cause the one or more processors to:
   determine a speed of the transition of the angle of the hinge to the second angle; and
   notify the operating system process of the operating system of the IHS of the speed of the transition of the angle of the hinge to the second angle.

19. The computer-readable storage device of claim 18, wherein, if the notified speed of the transition of the hinge angle is above a threshold, the modifications to the plurality of outputs comprise at least one of: terminating audio outputs by the IHS, minimizing a plurality of interfaces displayed by the IHS, and terminating outputs to one or more displays utilized by the IHS.

20. The computer-readable storage device of claim 18, wherein, if the notified speed of the transition of the hinge angle is below a threshold, the modifications to the plurality of outputs comprise pausing a plurality of multimedia outputs of the IHS.

* * * * *